(No Model.)

C. W. BURGTORF.
SEAT FOR TWO WHEELED VEHICLES.

No. 330,559. Patented Nov. 17, 1885.

Attest:
F. H. Schott
Fred E. Tasker

Inventor:
Charles W. Burgtorf
by J. O. Tasker atty

UNITED STATES PATENT OFFICE.

CHARLES W. BURGTORF, OF PETALUMA, CALIFORNIA.

SEAT FOR TWO-WHEELED VEHICLES.

SPECIFICATION forming part of Letters Patent No. 330,559, dated November 17, 1885.

Application filed April 23, 1885. Serial No. 163,214. (No model.)

*To all whom it may concern:*

Be it known that I, CHARLES W. BURGTORF, a citizen of the United States, residing at Petaluma, in the county of Sonoma and State of California, have invented a new and useful Improvement in Two-Wheeled Vehicles, of which the following is a specification.

The object of my invention is to provide a means whereby the divided seat of a two-wheeled-vehicle is made adjustable parallel with the body for the purpose of a more equal distribution of the weight or contents of the vehicle, and also to provide more room for the occupants thereof. I accomplish this object by the means illustrated in the accompanying drawings, in which—

Figure 1:
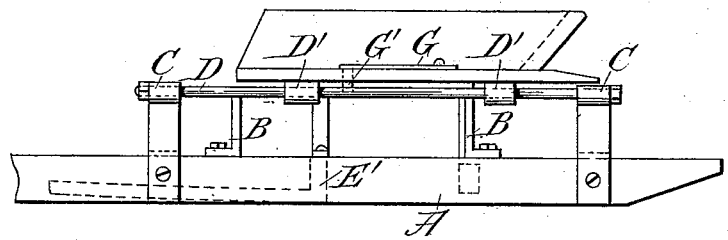
Figure 2:
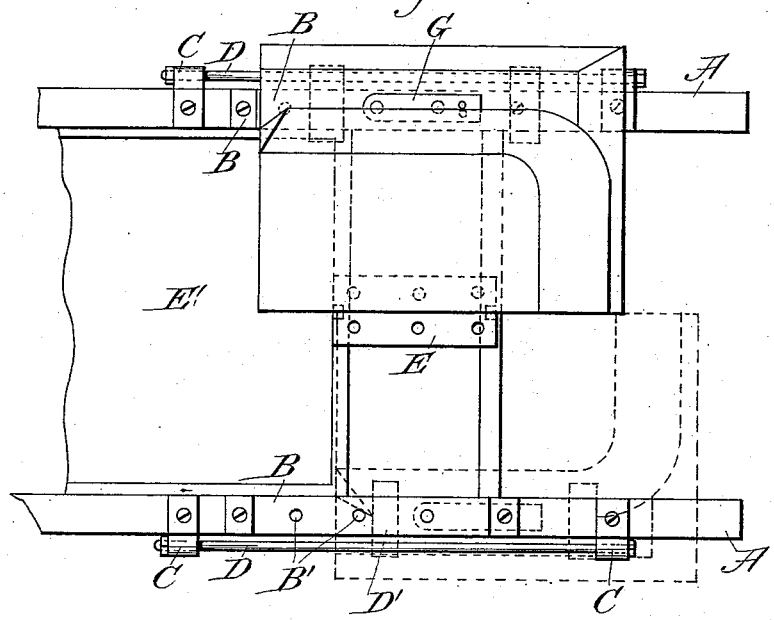
Figure 3:
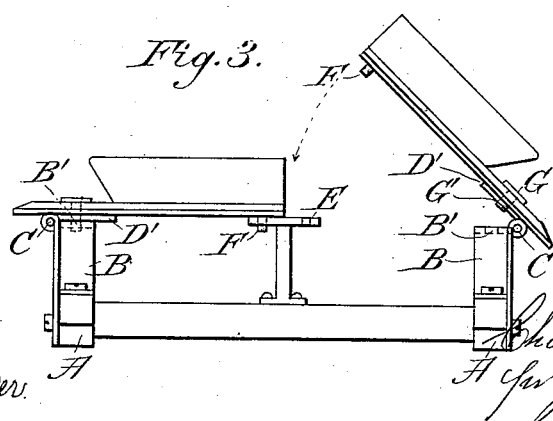

Figure 1 is a side sectional elevation of my two-wheeled vehicle. Fig. 2 is a plan or top view. Fig. 3 is a rear end view in section.

Similar letters refer to similar parts throughout the several views.

To the rear end of the shaft or body pieces A of the vehicle, and upon the upper faces thereof, I connect by bolts, straps, or otherwise brackets or bolsters B, which are provided with holes B', and to the outside of these brackets or bolsters is connected upwardly-projecting hangers C C, upon which the outer ends of the divided seats operate by the means of rods D, passing through the hangers, and straps D, screwed to the face of each seat in such a manner as to admit of the seats being moved backward and forward upon the rods or be thrown upward or sidewise toward the wheels beyond a vertical position until thrown down upon a central support and locked, to be hereinafter more fully described.

Within the center of the vehicle-body is placed a flat plate, E, suitably supported upon the rail of the body and step or platform, and upon this flat plate the two meeting ends of the seats rest when in position. This plate is provided with two lines of holes made parallel with each other to receive the pins F upon the lower faces of the meeting ends of the seats. A spring-catch, G, is placed upon the upper surface of each seat, having a projecting pin, G', connected therewith, which pin passes through the seat and engages with the holes in the bracket or bolster upon that side of the vehicle, the springs preventing the pins from binding in the holes, while the pins F engage with the holes in the flat center plate, E, and the two pins upon each portion of the divided seat when in position prevent that part of the seat from moving whether the seats are parallel with each other or not. The rods upon which the seats slide are provided with a screw and nut at their lower ends, and a slit or nick for the introduction of a screw-driver to tighten up the rods in the hangers at the upper ends.

By this construction it is evident that any number of holes may be employed in the brackets or bolsters and flat center plate, so that they can be engaged by the pins upon the seat or seats, and also that the seats may be pivoted upon this center plate and open one upon the other in an alternate manner without departing from the spirit or essence of my invention.

In operation the divided seats, either one or both, are thrown backward by the person entering the vehicle, through the medium of the platform or step placed at the rear end of the vehicle, when the seat or seats are moved backward or forward on the rods, as the case may be, to the desired position to balance the load or contents of the vehicle, or to provide more or less space in front for the feet and legs of the occupants, the pins upon both sections or seats entering the holes when shut within the bolsters or brackets, and in the center plate at the respective sides and center of the vehicle, and prevent the seats from moving from their position whether the front edges are on a parallel line or not, as by this construction and arrangement of parts is such that one section or seat may be moved downward to the lower end of the rod and the other backward or upward to the upper end of its rod. Thus it will be seen that the carrying weight of the vehicle can be adjusted to balance it more nearly upon the springs and axle and relieve the bearing down or pressure upon the forward portion of the shafts as well as upon the back of the animal attached to the cart or vehicle.

Having thus described my invention, what I claim, and desire to secure by Letters Patent, is—

1. In a two-wheeled vehicle or cart, the divided seat arranged for longitudinal adjustment, consisting of the rods to which the seats are hinged, and the seats provided with lower projecting pins which enter holes upon either side and in the center of the vehicle in such a manner that when the seat or seats are in position they will be immovable, as set forth and specified.

2. In a two-wheeled vehicle having a divided seat or seats in sections hinged to the sides of the vehicle with downwardly-projecting pins, the brackets or bolsters at the rear end of the shafts or body provided with a series of holes, and a center plate supported upon a suitable standard or bracket also provided with a series of holes made parallel with each other, the said holes upon both the bolsters or brackets and center plate arranged to receive the pins upon the lower face of the seats and prevent them from moving when in position, constructed, arranged, and operating substantially in the manner as herein set forth and specified.

In testimony that I claim the foregoing I have hereunto set my hand and seal.

CHARLES W. BURGTORF. [L. S.]

Witnesses:
WILMER BRADFORD,
CHAS. E. KELLY.